(12) United States Patent
Tyagi et al.

(10) Patent No.: US 10,262,278 B2
(45) Date of Patent: Apr. 16, 2019

(54) SYSTEMS AND METHODS FOR IDENTIFICATION AND INTERACTION WITH ELECTRONIC DEVICES USING AN AUGMENTED REALITY DEVICE

(71) Applicant: Motorola Mobility LLC, Chicago, IL (US)

(72) Inventors: Vivek K. Tyagi, Chicago, IL (US); Sudhir C. Vissa, Bensenville, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 116 days.

(21) Appl. No.: 15/433,307

(22) Filed: Feb. 15, 2017

(65) Prior Publication Data

US 2018/0232553 A1   Aug. 16, 2018

(51) Int. Cl.
| | | |
|---|---|---|
| *G06Q 10/10* | (2012.01) | |
| *G06Q 50/10* | (2012.01) | |
| *G06Q 10/00* | (2012.01) | |
| *G06Q 50/00* | (2012.01) | |

(52) U.S. Cl.
CPC ........... *G06Q 10/00* (2013.01); *G06Q 10/101* (2013.01); *G06Q 50/01* (2013.01)

(58) Field of Classification Search
CPC ....... G06K 19/06037; G06K 19/06112; G06K 7/1447; G06K 7/1417; G06K 7/10722
See application file for complete search history.

(56) References Cited

U.S. PATENT DOCUMENTS

| | | | | |
|---|---|---|---|---|
| 2003/0020707 A1* | 1/2003 | Kangas | ................... | G06F 3/011 345/418 |
| 2006/0202804 A1* | 9/2006 | Vijay-Pillai | ........ | G06K 19/0705 340/10.33 |
| 2010/0271187 A1* | 10/2010 | Uysal | ................... | G06K 7/0008 340/10.4 |
| 2012/0268286 A1* | 10/2012 | Jin | ...................... | H04L 12/2807 340/815.4 |
| 2014/0055488 A1* | 2/2014 | Masters | .................. | G06F 3/147 345/633 |
| 2016/0005233 A1* | 1/2016 | Fraccaroli | .......... | G02B 27/0172 345/633 |

* cited by examiner

*Primary Examiner* — Laura A Gudorf

(57) ABSTRACT

Systems and methods differentiate and uniquely identify electronic devices to enable their virtual interaction with an augmented reality device. According to certain aspects, an augmented reality device can differentiate between electronic devices in an environment that have a substantially similar appearance. A user can subsequently use the augmented reality device to virtually interact with the uniquely identified electronic devices. An improved user experience and greater user satisfaction with the augmented reality device may result through the use of these systems and methods.

19 Claims, 4 Drawing Sheets

SYSTEMS AND METHODS FOR IDENTIFICATION AND INTERACTION WITH ELECTRONIC DEVICES USING AN AUGMENTED REALITY DEVICE

FIELD

This application generally relates to systems and methods of identifying and virtually interacting with electronic devices using an augmented reality device. In particular, this application relates to systems and methods for differentiating and uniquely identifying electronic devices to enable their virtual interaction with an augmented reality device.

BACKGROUND

Augmented reality technology enables users to see a view the physical real-world environment that is integrated and supplemented with information, and also allows users to virtually interact with objects in the environment. Devices which can utilize augmented reality technology include headsets, smartphones, tablets, eyeglasses, and head-up displays, for example. The information presented on the devices may include, for example, sound, video, graphics, and interactive markers. The information may relate to a particular object in the environment, such as a name of an object, a phone number associated with a phone, etc. One type of object in an environment may be an electronic device (e.g., smartphones, PDAs, etc.).

A user using an augmented reality device can interact with objects in its field of view. However, an object in an environment is not typically aware whether it is in the field of view of an augmented reality device. Accordingly, the augmented reality device may recognize and track the objects in its field of view using cameras and/or optical sensors, for example, by using various computer vision and image processing techniques.

However, if multiple objects in the environment appear identical or substantially similar, then the augmented reality device may not be able to uniquely identify each of the multiple objects. For example, if two smartphones of the same model are in the field of view of an augmented reality device, then the augmented reality device would not be able to uniquely identify each of the smartphones. The augmented reality device may also not be able to uniquely identify an object that is far away in the field of view. For example, if a smartphone is located at a far end of the room away from the augmented reality device, visual identifying features of the smartphone may difficult to discern. In these cases, the augmented reality device would not be able to supplement the user's view with information associated with the smartphones, and consequently the user would not be able to virtually interact with the smartphones using the augmented reality device.

Accordingly, there is an opportunity for systems and methods that address these concerns and improve the user experience with augmented reality devices so that objects in an environment can be uniquely identified and virtually interacted with.

SUMMARY

In an embodiment, a system includes an augmented reality device and an electronic device. The augmented reality device may include a scanning device, a first transceiver, a first processor, and a first memory. The scanning device may be operatively coupled with the first processor and be configured to sense an identifier from an identifying device of the electronic device. The first transceiver may be operatively coupled with the first processor and be configured to transmit an activation signal to the electronic device to activate the identifying device. The first processor may be configured to receive a scanning signal from the scanning device after the identifier is sensed, and assign a unique identifier for the electronic device, in response to receiving the scanning signal. The first memory may be operatively coupled with the first processor and be configured to store the unique identifier.

The electronic device may include the identifying device, a second transceiver, and a second processor. The identifying device may be operatively coupled with the second processor and be configured to present the identifier. The second transceiver may be operatively coupled with the second processor and be configured to receive the activation signal. The second processor configured to activate the identifying device to present the identifier, in response to receiving the activation signal.

In another embodiment, an augmented reality device includes a user interface, a scanning device, a processor, a transceiver, and a memory. The user interface may be operatively coupled with the processor and be configured to receive a user request to initiate scanning for one or more electronic devices. The scanning device may be operatively coupled with the processor and be configured to sense an identifier from an identifying device of the one or more electronic devices. The processor may be configured to determine that at least one connected electronic device of the one or more electronic devices is in communication with a transceiver, in response to receiving the user request; receive a scanning signal from the scanning device after the identifier is sensed; and assign a unique identifier for the at least one connected electronic device in the memory, in response to receiving the scanning signal. The transceiver may be operatively coupled with the processor and be configured to transmit an activation signal to the at least one connected electronic device to activate the identifying device, in response to determining that the at least one connected electronic device is in communication with the transceiver. The memory may be operatively coupled with the processor and be configured to store the unique identifier.

In a further embodiment, a method includes receiving a user request at a processor of an augmented reality device through a user interface of the augmented reality device, where the user request for initiating scanning is for one or more electronic devices; determining at least one connected electronic device of the one or more electric devices that is in communication with a transceiver of the augmented reality device, in response to receiving the user request, using the processor; transmitting an activation signal from the processor to the at least one connected electronic device to activate an identifying device of the at least one connected electronic device, using the transceiver, in response to determining that the at least one connected electronic device is in communication with the transceiver; receiving a scanning signal from a scanning device at the processor after an identifier is sensed from the identifying device; assigning a unique identifier for the at least one connected electronic device, in response to receiving the scanning signal, using the processor; and storing the unique identifier in a memory of the augmented reality device.

BRIEF DESCRIPTION OF THE DRAWINGS

The accompanying figures, where like reference numerals refer to identical or functionally similar elements throughout

DETAILED DESCRIPTION

Figure 1:
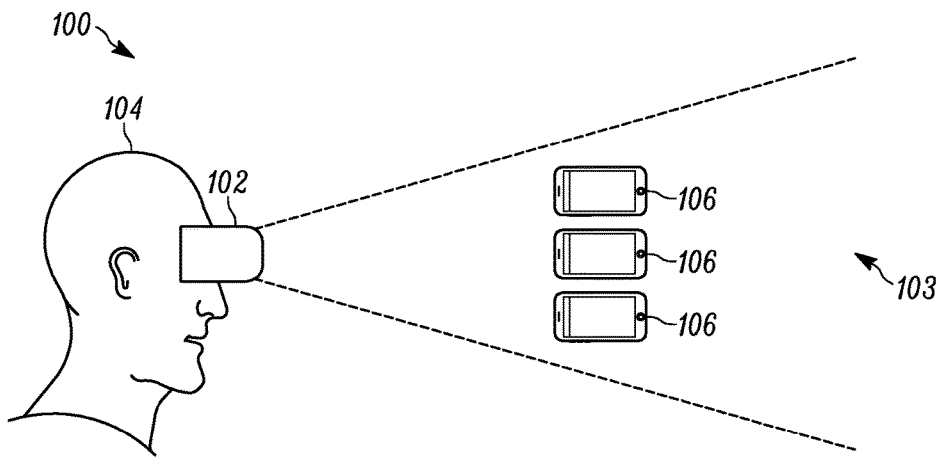
FIG. 1 is an exemplary environment in which embodiments may be utilized.
Figure 2:
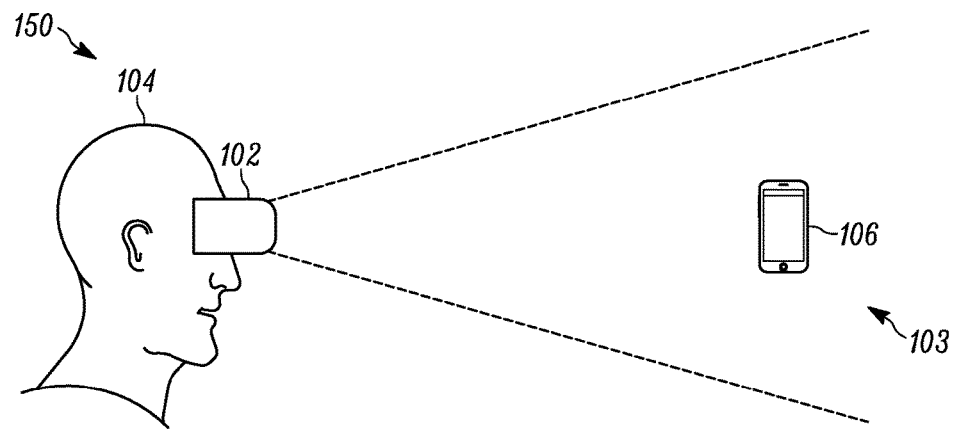
FIG. 2 is an exemplary environment in which embodiments may be utilized.

FIGS. 1-2 illustrate exemplary environments 100, 150 in which embodiments may be utilized. The environments 100, 150 may include an augmented reality device 102 that can be operated by a user 104, and one or more electronic devices 106. The augmented reality device 102 may be used to uniquely identify and interact with the electronic devices 106. For example, the augmented reality device 102 may have a display that shows the environments 100, 150 in its field of view 103 (including the electronic devices 106) integrated with information, such as graphics, video, and/or sound. In addition, the user 104 of the augmented reality device 102 may be able to virtually interact with the electronic devices 106 and other objects in the environments 100, 150. FIGS. 1-2 show the user 104 with an exemplary headset type of augmented reality device 102. Other types of the augmented reality device 102 may include, for example, smartphones, tablets, eyeglasses, and head-up displays. The field of view 103 of the augmented reality device 102 is denoted in FIGS. 1-2 by dashed lines.

The electronic devices 106 may be stationary or portable and may be, for example, a smartphone, a cellular phone, a personal digital assistant, a tablet computer, a laptop computer, a networked television set, or the like. In the environment 100 of FIG. 1, several of the electronic devices 106 may have a substantially similar appearance to one another, such as when multiple devices of the same model are physically present (e.g., several Moto Z smartphones). Such multiple devices may not be uniquely identifiable using object recognition techniques. Although the electronic devices 106 may appear substantially similar to one another, the augmented reality device 102 may be able to uniquely identify each of the electronic devices 106. In the environment 150 of FIG. 2, there may be an electronic device 106 that cannot be visually identified that is in the field of view 103 of the augmented reality device 102, such as if the electronic device 106 is too far away to allow the augmented reality device 102 to discern identifying features of the electronic device 106. In particular, features of the electronic device 106 may be too small to distinguish when the electronic device 106 is a large distance away from the augmented reality device 102.

In these cases, the augmented reality device 102 may also be able to uniquely identify this particular electronic device 106. By uniquely identifying the electronic devices 106, the user 104 of the augmented reality device 102 may view the supplemental information associated with each of the particular electronic devices 106, and also allow virtual interaction with each of the particular electronic devices 106. In this way, the user 104 may have a better experience and be more satisfied with the operation of the augmented reality device 102. It should be appreciated that other benefits and efficiencies are envisioned.

Figure 3:
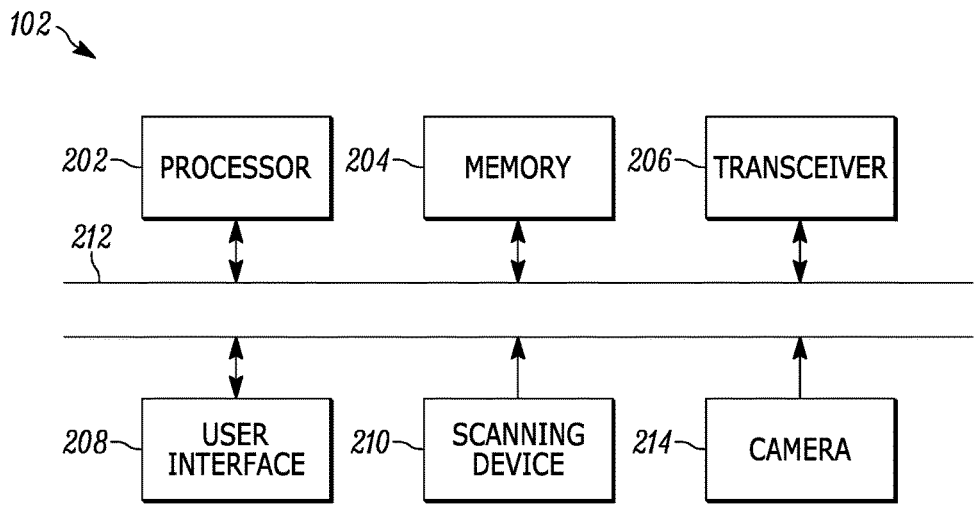
FIG. 3 is a block diagram of an augmented reality device, in accordance with some embodiments.

FIG. 3 illustrates a block diagram of an augmented reality device 102 in which embodiments may be implemented. The augmented reality device 102 may uniquely identify and enable interaction with electronic devices 106 that have a substantially similar appearance in an environment 100. The augmented reality device 102 may include a processor 202 in communication via a bus 212 with a memory 204, a transceiver 206, a user interface 208, and a scanning device 210. As described below, the scanning device 210 may sense an identifier from the electronic devices 106, and in particular, from an identifying device 310 of the electronic devices 106. Through sensing of the identifier from the electronic devices 106, particular electronic devices 106 may subsequently be optically recognized by the augmented reality device 102 such that a unique identification is associated with each of the particular electronic devices 106.

Figure 4:
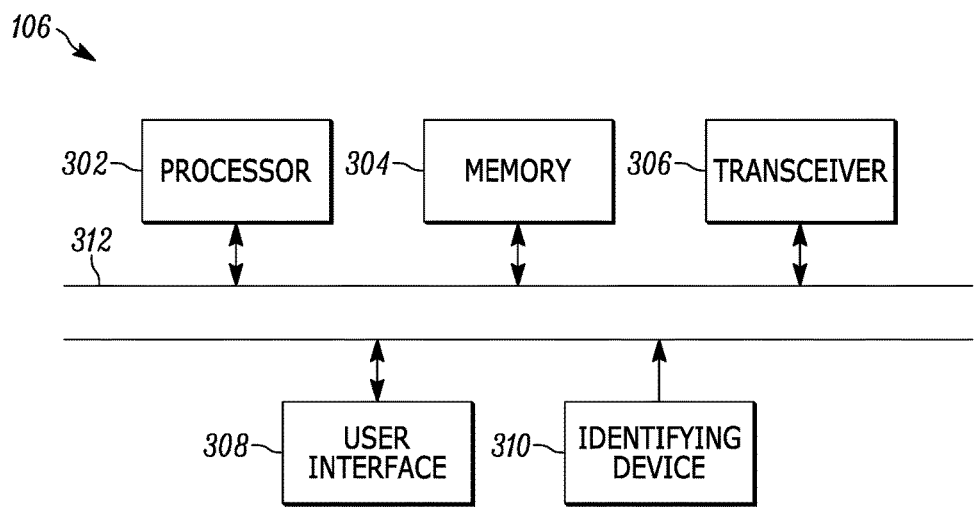
FIG. 4 is a block diagram of an electronic device, in accordance with some embodiments.

FIG. 4 illustrates a block diagram of an electronic device 106 in which embodiments may be implemented. The electronic device 106 may be able to identify itself to an augmented reality device 102 with an identifying device 310, and interact with and communicate with the augmented reality device 102 via a transceiver 306. The electronic device 106 may include a processor 302 in communication via a bus 312 with a memory 304, a transceiver 306, a user interface 308, and an identifying device 310. The processor 302 may be configured to perform various actions on the electronic device 106 and/or control the transceiver 306, user interface 308, and/or identifying device 310. Such actions may include placing or receiving a phone call, accessing a website, taking a picture, and executing various applications, for example. An action may be performed on the electronic device 106 in response to receiving a control signal from the augmented reality device 102, in some embodiments. For example, after the augmented reality device 102 has uniquely identified a particular electronic device 106, a user 104 of the augmented reality device 102 may be able to virtually interact with the particular electronic device 106. When the user 104 does this virtual interaction, the augmented reality device 102 may transmit a control signal to the electronic device 106 to perform a certain action associated with the virtual interaction. The virtual interaction performed by the user 104 may determine what the action performed on the electronic device 106 is. For example, if the electronic device 106 is a sound bar, a virtual interaction with it may include the user 104 virtually manipulating a volume control of the sound bar to increase or decrease its volume.

The software in the memory 204, 304 may include one or more separate programs or applications. The programs may have ordered listings of executable instructions for implementing logical functions. The software may include a suitable operating system of the electronic device, such as Android from Google, Inc., iOS from Apple, Inc., or Windows Phone and Windows 10 Mobile from Microsoft Corporation. The operating system essentially controls the execution of other computer programs, and provides scheduling, input-output control, file and data management, memory management, and communication control and related services.

The transceiver 206, 306 may send and receive data over a network, for example. The transceiver 206, 306 may be adapted to receive and transmit data over a wireless and/or wired connection. The transceiver 206, 306 may function in accordance with the IEEE 802.11 standard or other standards. More particularly, the transceiver 206, 306 may be a WWAN transceiver configured to communicate with a wide area network including one or more cell sites or base stations to communicatively connect the augmented reality device 102 and electronic device 106 to additional devices or components. Further, the transceiver 206, 306 may be a WLAN and/or WPAN transceiver configured to connect the augmented reality device 102 and electronic device 106 to local area networks and/or personal area networks, such as a Bluetooth network or Bluetooth Low Energy connection. In some embodiments, the transceiver 206, 306 may be an RFD transceiver.

The transceiver 206 of the augmented reality device 102 may communicate directly or indirectly with the electronic devices 106 to send and receive data, for example. Similarly, the transceiver 306 may communicate directly or indirectly with the augmented reality device 102 to send and receive data, for example. In some embodiments, it may be determined using the transceiver 206, 306 whether the augmented reality device 102 is connected to one or more of the electronic devices 106, and vice versa. Whether the augmented reality device 102 is connected to one or more of the electronic devices 106 may be helpful in uniquely identifying and interacting with the electronic devices 106, such as by transmitting an activation signal and a control signal, as described in more detail below.

The user interface 208, 308 may include additional I/O components (not shown), such as keys, buttons, lights, LEDs, cursor control devices, haptic devices, etc. The display and the additional I/O components may be considered to form portions of the user interface 208, 308 (e.g., portions of the augmented reality device 102 and electronic device 106 associated with presenting information to the user 104 and/or receiving inputs from the user 104). In some embodiments, the display is a touchscreen display composed of singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, lenticular barriers, and/or others. Further, the display can include a thin, transparent touch sensor component superimposed upon a display section that is viewable by a user. For example, such displays include capacitive touch screens, resistive touch screens, surface acoustic wave (SAW) touch screens, optical imaging touch screens, and the like.

Figure 5:
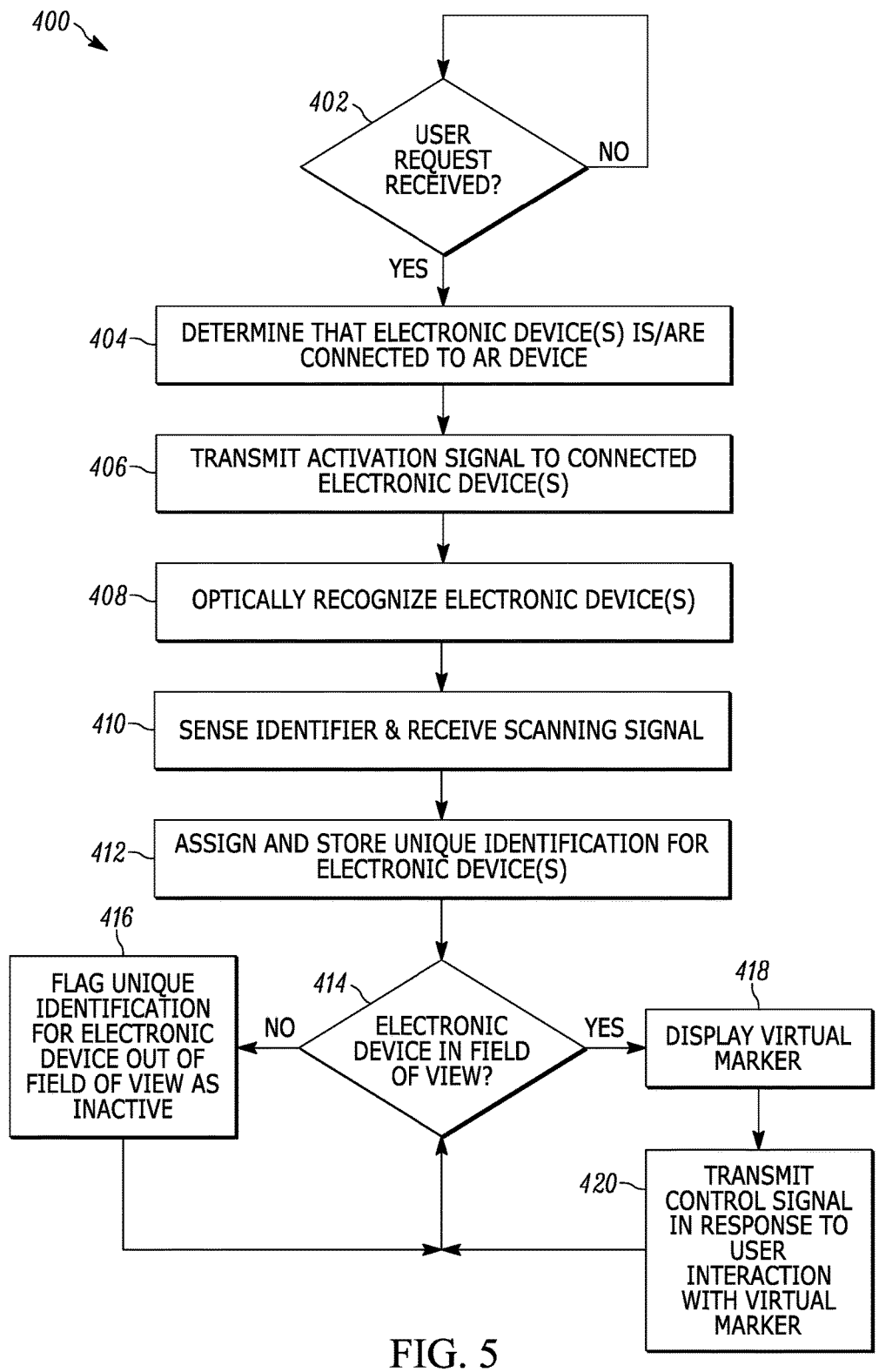
FIG. 5 is a flow diagram depicting the identification of and interaction with electronic devices by an augmented reality device, in accordance with some embodiments.
Figure 6:
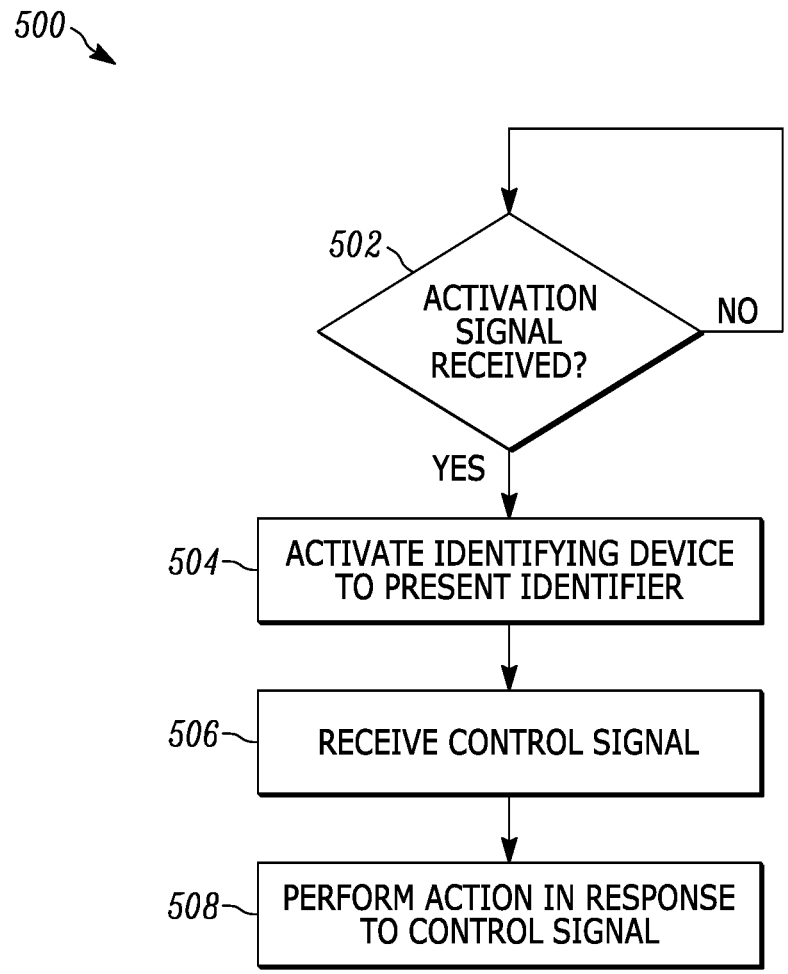
FIG. 6 is a flow diagram depicting the interaction with an augmented reality device by an electronic device, in accordance with some embodiments.

FIGS. 5-6 illustrate embodiments of methods 400, 500 for utilizing the augmented reality device 102. In particular, FIG. 5 illustrates the method 400 for the augmented reality device 102 to uniquely identify and interact with one or more electronic devices 106 in an environment 100, and the method 500 illustrates the method 500 for an electronic device 106 to interact with the augmented reality device 102. The methods 400, 500 can enable the augmented reality device 102 to uniquely identify and interact with multiple electronic devices 106 in an environment 100 that appear substantially similar to one another, and to uniquely identify and interact with an electronic device 106 that cannot be visually identified (e.g., is too far away). Using the methods 400, 500 can enable the augmented reality device 102 to recognize such electronic devices 106 when there has been no prior mapping by the augmented reality device 102 of the electronic devices 106.

In general, a computer program product in accordance with the embodiments includes a computer usable storage medium (e.g., standard random access memory (RAM), an optical disc, a universal serial bus (USB) drive, or the like) having computer-readable program code embodied therein, wherein the computer-readable program code is adapted to be executed by the process (e.g., working in connection with an operating system) to implement the methods described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Referring to the method 400 of FIG. 5, it can be determined whether a user request to initiate scanning for electronic devices 106 has been received from the user 104 of the augmented reality device 102, such as at step 402. The user 104 may initiate the user request via the user interface 208, for example, and the user request may be transmitted to the processor 202. The user request may be initiated when the user 104 desires to have the augmented reality device 102 map physical objects (such as electronic devices 106) in the environment 100 to virtual objects. If a user request has not been received at step 402, then the method 400 may remain at step 402 until a user request is received. In some embodiments, the augmented reality device 102 may continually scan for electronic devices 106 instead of waiting for a user request.

If a user request has been received at step 402, then the method 400 continues to step 404. At step 404, the processor 202 may determine the electronic devices 106 that are in communication with the augmented reality device 102. In particular, using the transceiver 206, the processor 202 may determine which electronic devices 106 are connected to and in communication with the augmented reality device 102. Such connected electronic devices 106 may be the electronic devices 106 that are in range of the augmented reality device 102 and that have either a persistent connection or can be connected on demand with the augmented reality device 102. For example, particular electronic devices 106 in the environment may already be in communication with the augmented reality device 102, i.e., have a persistent connection, via a Bluetooth Low Energy connection or a network connection. A network connection may include, for example, a network with any suitable topology, such as infrastructure, ad hoc, star, mesh, etc. In some embodiments, the transceiver 206 may connect to known electronic devices 106 at step 404, in response to receiving the user request at step 402, i.e., be connected on demand.

Continuing to step 406, an activation signal may be transmitted via the transceiver 206 from the augmented reality device 102 to each of the connected electronic devices 106. In embodiments, the augmented reality device 102 may sequentially transmit an activation signal to each of the electronic devices 106 that it is connected to (as determined previously at step 404). The activation signal may instruct an electric device 106 to active its identifying device 310. The activation signals may be transmitted using a round robin technique, for example, so that only one identifying device 310 at a time is activated to transmit its identifier. Details of the identifying device 310 of the electronic devices 106 are described more below.

When a particular identifying device 310 transmits its identifier (in response to receiving an activation signal at step 406), the processor 202 and a camera 214 of the augmented reality device 102 may optically recognize the particular electronic device 106 associated with the particular identifying device 310, such as at step 408. The augmented reality device 102 may utilize object recognition techniques, as is known in the art, to recognize the particular electronic device 106 that is currently transmitting its identifier.

At step 410, the scanning device 210 of the augmented reality device 102 may sense the identifier being transmitted from an identifying device 310 of a particular electronic device 106. As detailed below, the identifying device 310 may be an infrared beacon, an RFID tag, or a display, for example. Accordingly, the scanning device 210 of the augmented reality device 102 may be, for example, an infrared sensor that can detect an infrared signal, an RFID reader that can detect an RF signal from an RFID tag, or a camera that can capture a QR code or other visual indicia. In some embodiments, the scanning device 210 may be the camera 214 described previously.

The scanning device 210 may therefore be able to sense, detect, and identify a particular electronic device 106 via its identifying device 310, in combination with optically recognizing the particular electronic device 106. When a particular electronic device 106 is sensed by the scanning device 210, then the scanning device 210 may transmit a scanning signal to the processor 202. The processor 202 may then assign a unique identification for the particular electronic device 106, and the unique identification may be stored in the memory 204, such as at step 412.

In embodiments, the unique identification assigned and stored at step 412 may be mapped in the memory 204 with a network interface identifier associated with the particular electronic device 106 and/or a virtual marker associated with the particular electronic device 106. The network interface identifier of the particular electronic device 106 may be hardware-related (e.g., MAC address) and/or software-related (e.g., a service name, IP address, socket port, etc.).

The virtual marker may serve as a unique visual cue so that the particular electronic device 106 is easily identified and interacted with by a user 104. For example, a particular electronic device 106 may be present in a scene and be associated with a particular virtual marker. If a user 104 of the augmented reality device 102 leaves the scene and later re-enters the scene, the user 104 may more easily recognize the particular electronic device 106 because the same particular virtual marker may be used. As another example, the virtual marker can be used to identify states of the particular electronic device 106, such as by changing the color of the virtual marker when a smartphone is currently being used for a call.

Steps 406-412 may be repeated until an activation signal has been transmitted to each connected electronic device 106 (step 406), each connected electronic device 106 has been optically recognized (step 408), each identifier from each connected electronic device 106 has been sensed (step 410), and a unique identification has been assigned and stored for each connected electronic device (step 412).

After a unique identification has been assigned for each of the connected electronic devices 106 at step 412, the augmented reality device 102 may track the identified electronic devices 106 while they are in its field of view 103 and in line of sight, in particular, it may be determined whether each identified electronic device 106 is in the field of view 103 and in line of sight of the augmented reality device 102, such as at step 414. If a particular identified electronic device 106 is in the field of view 103 and in line of sight, then the method 400 may continue to step 418. At step 418, a virtual marker may be displayed on the user interface 208 (e.g., a display) so that a user 104 of the augmented reality device 102 can see the virtual marker. The virtual marker may be associated with the particular identified electronic device 106. The virtual marker may identify the particular identified electronic device 106 to the user 104 and/or may include virtual controls that the user 104 can manipulate.

The user 104 may also use the augmented reality device 102 to virtually interact with the particular identified electronic device 106 via its associated virtual marker. For example, if the particular identified electronic device 106 is a smartphone, the virtual marker may include virtual controls to dial a phone number or look up a contact in a directory. When the user 104 interacts with the particular identified electronic device 106, the augmented reality device 102 may transmit control signals to perform certain actions on the particular identified electronic device 106, such as at step 420. The actions may be associated with the virtual interaction of the user 104.

The method 400 may return to step 414 to determine whether the particular identified electronic device 106 is in the field of view 103 and in line of sight. The virtual marker and/or virtual interaction with a particular identified electronic device 106 may continue while the particular electronic device remains in the field of view 103 and in line of sight, such as by repeating steps 414, 418, and 420.

However, if at step 414 it is determined that a particular identified electronic device 106 is not in the field of view 103 and in line of sight of the augmented reality device 102, then the method 400 may continue to step 416. At step 416, the unique identification for the particular identified electronic device 106 that is no longer in the field of view 103 and in line of sight may be flagged as inactive in the memory 204. In some embodiments, the unique identification for the particular identified electronic device 106 that is no longer in the field of view 103 and in line of sight may be deleted from the memory 204 at step 416. The method 400 may return to step 414 to determine whether other electronic devices 106 are still in the field of view 103 and in line of sight.

Referring to FIG. 6, the method 500 illustrates how an electronic device 106 may connect and interact with an augmented reality device 102. The electronic device 106 may determine whether an activation signal has been received from the augmented reality device 102 by the transceiver 306, such as at step 502. As described above, an activation signal may be transmitted from the augmented reality device 102 at step 406 of the method 400 after a user request to initiate scanning of electronic devices 106. If an activation signal has not been received by the transceiver 306, then the method 500 remains at step 502 until an activation signal has been received.

If an activation signal has been received at step 502, then the method 500 may continue to step 504. At step 504, in response to receiving the activation signal, an identifying device 310 of the electronic device 106 may be activated to present its identifier. The identifying device 310 may present an identifier to be detected by the scanning device 210 of the augmented reality device 102, as described above at step 410 of the method 400. The identifier may allow the electronic device 106 to be sensed and identified by the augmented reality device 102, such as when the augmented reality device 102 is attempting to detect and identify several electronic devices 106 that appear substantially similar to one another.

The identifying device 310 may be an infrared beacon, an RFD tag, or a display, for example. In particular, if the identifying device 310 is an infrared beacon, then the identifier may be an infrared signal. If the identifying device 310 is an RFID tag, then the identifier may be an RF signal. If the identifying device 310 is a display, such as part of the user interface 308, then the identifier may be a QR code or other visual indicia. The infrared beacon, the RFD tag (e.g., an active RFID tag), or the display, for example, may be turned on at step 504 after the activation signal is received at step 502. In some embodiments, the identifier may be unique, and in other embodiments, the identifier may not be unique (i.e., may allow the scanning device 210 of the augmented reality device 102 to visually map the electronic device 106 via its identifying device 310).

The electronic device 106 may later receive a control signal from the augmented reality device 102 via the transceiver 306, such as at step 506. The control signal may be transmitted from the augmented reality device 102 such as when the user 104 of the augmented reality device 102 has virtually interacted with the electronic device 106. One or more associated actions corresponding to the control signal may be performed by the processor 302 of the electronic device 106 in response to receiving the control signal, such as at step 508.

For example, if one of the identified electronic devices 106 is a music player, a user 104 of the augmented reality device 102 may be able to virtually interact with and control the music player. Accordingly, the virtual interaction by the user 104 on the augmented reality device 102 may result in a control signal being transmitted to the electronic device 106 to change the volume or the song being played, for example. The received control signal would result in the action being performed on the electronic device 106. As another example, if one of the identified electronic devices 106 is a controllable smart light bulb, a user 104 of the augmented reality device 102 may be able to virtually interact with and control the light bulb. Accordingly, the virtual interaction by the user 104 on the augmented reality device 102 may be to interact with a color palette so that a control signal is transmitted to the electronic device 106 to change its color and intensity.

Thus, it should be clear from the preceding disclosure that systems and methods for differentiating and uniquely identifying electronic devices to enable their virtual interaction with an augmented reality device may be performed to improve the user experience. The systems and methods can also cause a user to be more satisfied with the operation of the augmented reality device.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A system comprising:
(A) an augmented reality device comprising:
a scanning device operatively coupled with a first processor, the scanning device configured to sense an identifier from an identifying device of an electronic device;
the first processor configured to:
determine that the electronic device is in communication with the augmented reality device;
receive a scanning signal from the scanning device after the identifier is sensed; and
assign a unique identification for the electronic device, in response to receiving the scanning signal;
a first transceiver operatively coupled with the first processor, the first transceiver configured to transmit an activation signal to the electronic device to activate the identifying device of the electronic device, in response to the first processor determining that the electronic device is in communication with the augmented reality device; and
a first memory operatively coupled with the first processor, the first memory configured to store the unique identification; and
(B) the electronic device comprising:
the identifying device operatively coupled with a second processor, the identifying device configured to present the identifier;
a second transceiver operatively coupled with the second processor, the second transceiver configured to receive the activation signal; and
the second processor configured to activate the identifying device to present the identifier, in response to receiving the activation signal.

2. The system of claim 1, wherein:
the first processor is further configured to receive a user request to initiate scanning for the electronic device; and
the first transceiver is configured to transmit the activation signal to the electronic device in response to receiving the user request to initiate scanning.

3. The system of claim 1, wherein the first and second transceivers are in communication via one or more of a Bluetooth Low Energy connection, a network connection, or an RFID connection.

4. The system of claim 1, wherein:
the scanning device comprises an infrared sensor configured to detect an infrared signal; and
the identifying device comprises an infrared beacon configured to transmit the infrared signal as the identifier.

5. The system of claim 1, wherein:
the scanning device comprises an RFID reader configured to control and detect an RFID tag; and
the identifying device comprises the RFID tag configured to transmit an RF signal as the identifier.

6. The system of claim 1, wherein:
the scanning device comprises a camera; and
the identifying device comprises a display operatively coupled with the second processor and configured to display a QR code as the identifier.

7. The system of claim 1, wherein the augmented reality device further comprises:
a camera operatively coupled to the first processor, the camera configured to optically recognize the electronic device; and a user interface operatively coupled to the first processor, the user interface configured to display an interactive virtual marker associated with the electronic device on the user interface.

8. The system of claim 7, wherein:
the first transceiver is further configured to transmit a control signal to the electronic device in response to user interaction with the virtual marker associated with the electronic device;
the second transceiver is configured to receive the control signal; and
the second processor is further configured to perform an action on the electronic device, in response to receiving the control signal.

9. An augmented reality device comprising:
a user interface operatively coupled with a processor, the user interface configured to receive a user request to initiate scanning for one or more electronic devices;
a scanning device operatively coupled with the processor, the scanning device configured to sense an identifier from an identifying device of the one or more electronic devices;
the processor configured to:
  determine that at least one connected electronic device of the one or more electronic devices is in communication with a transceiver, in response to receiving the user request;
  receive a scanning signal from the scanning device after the identifier is sensed; and
  assign a unique identification for the at least one connected electronic device in a memory, in response to receiving the scanning signal;
the transceiver operatively coupled with the processor, the transceiver configured to transmit an activation signal to the at least one connected electronic device to activate the identifying device, in response to determining that the at least one connected electronic device is in communication with the transceiver; and
the memory operatively coupled with the processor, the memory configured to store the unique identification.

10. The device of claim 9, wherein the transceiver is in communication via one or more of a Bluetooth Low Energy connection, a network connection, or an RFID connection.

11. The device of claim 9, wherein the scanning device comprises an infrared sensor configured to detect an infrared signal from the identifying device, wherein the infrared signal is the identifier.

12. The device of claim 9, wherein the scanning device comprises an RFID reader configured to control and detect an RFID tag of the identifying device, wherein the RFID tag is configured to transmit an RF signal as the identifier.

13. The device of claim 9, wherein the scanning device comprises a camera configured to detect a QR code from the identifying device, wherein the QR code is the identifier.

14. The device of claim 9:
further comprising a camera operatively coupled to the processor, the camera configured to optically recognize the at least one connected electronic device; and
wherein the user interface is further configured to display an interactive virtual marker associated with the at least one connected electronic device.

15. The device of claim 14, wherein the transceiver is further configured to transmit a control signal to the at least one connected electronic device in response to user interaction with the virtual marker on the user interface.

16. A method comprising:
receiving a user request at a processor of an augmented reality device through a user interface of the augmented reality device, the user request for initiating scanning for one or more electronic devices;
determining at least one connected electronic device of the one or more electronic devices that is in communication with a transceiver of the augmented reality device, in response to receiving the user request, using the processor;
transmitting an activation signal from the processor to the at least one connected electronic device to activate an identifying device of the at least one connected electronic device, using the transceiver, in response to determining that the at least one connected electronic device is in communication with the transceiver;
receiving a scanning signal from a scanning device at the processor after an identifier is sensed from the identifying device;
assigning a unique identification for the at least one connected electronic device, in response to receiving the scanning signal, using the processor; and
storing the unique identification in a memory of the augmented reality device.

17. The method of claim 16, further comprising:
optically recognizing the at least one connected electronic device, using a camera operatively coupled to the processor;
displaying an interactive virtual marker associated with the at least one connected electronic device on the user interface, using the processor; and
transmitting a control signal from the processor to the at least one connected electronic device in response to user interaction with the virtual marker on the user interface, using the transceiver.

18. The method of claim 16, wherein the scanning device comprises one or more of an infrared sensor, an RFID reader, or a camera.

19. The method of claim 16, wherein the transceiver is in communication via one or more of a Bluetooth Low Energy connection, a network connection, or an RFID connection.

* * * * *